March 14, 1961  G. M. STATKUS  2,974,642
CONTROL VALVE
Filed June 4, 1959  3 Sheets-Sheet 1
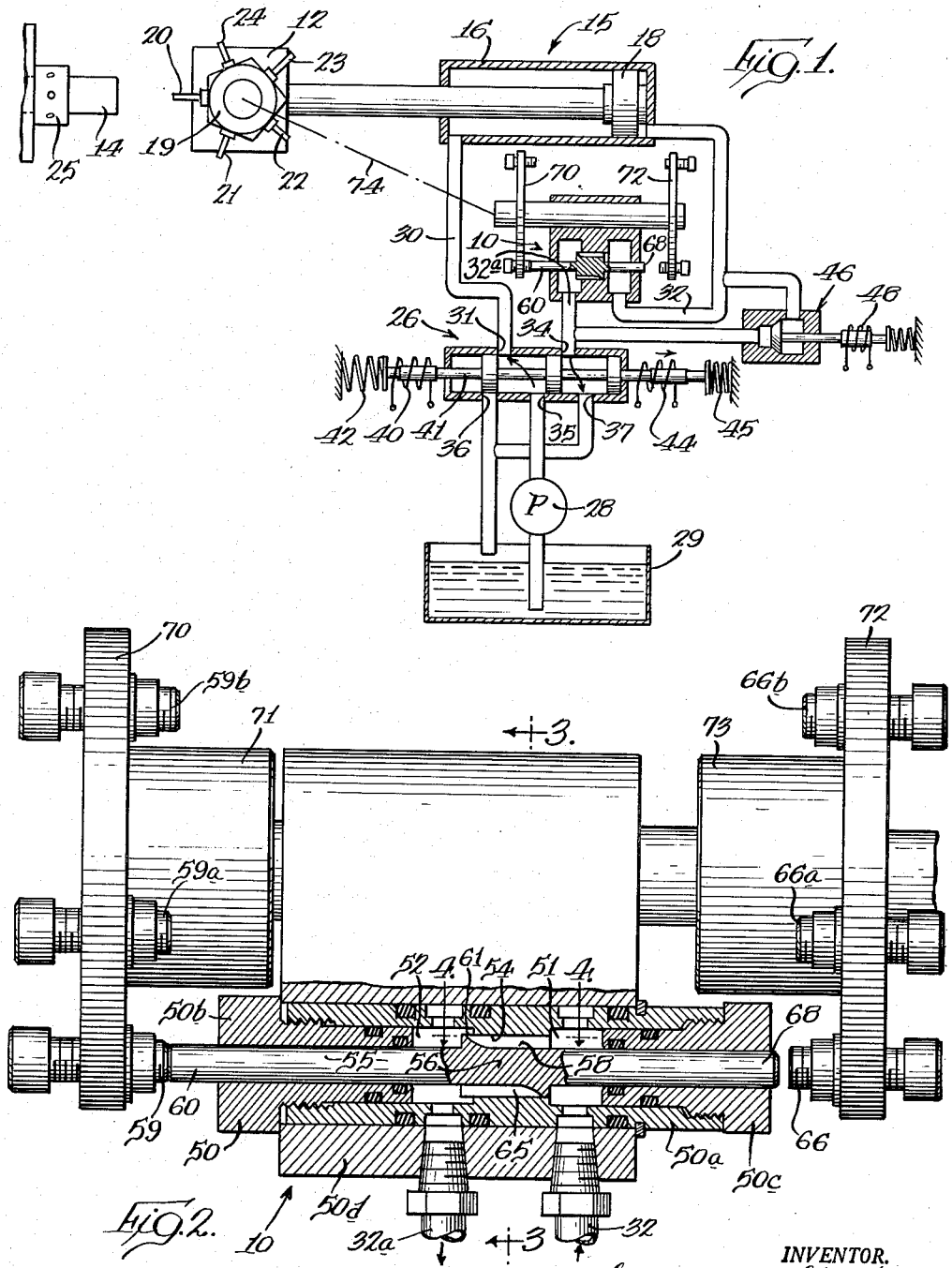
INVENTOR.
George M. Statkus
BY
Wolfe, Hubbard, Voit & Osann
Attys.

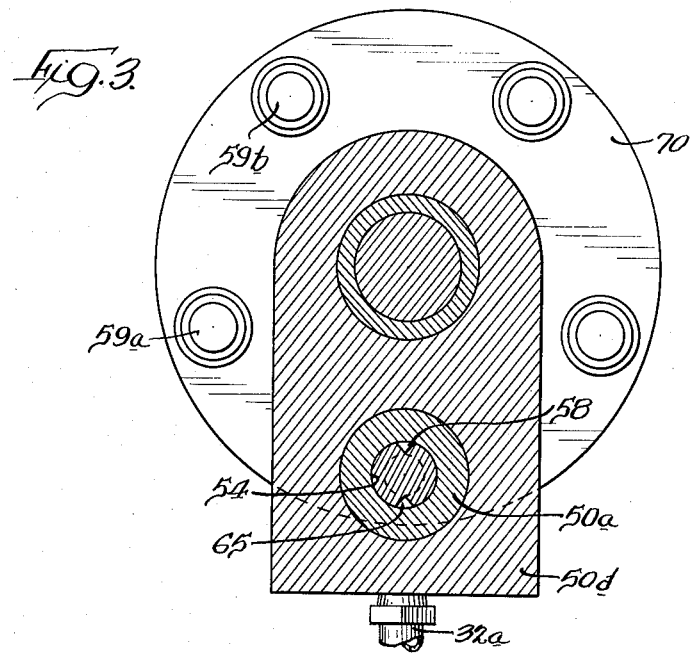
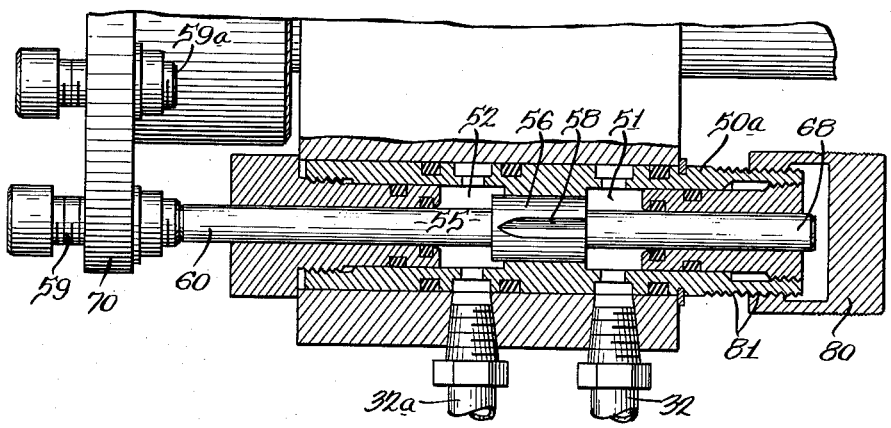

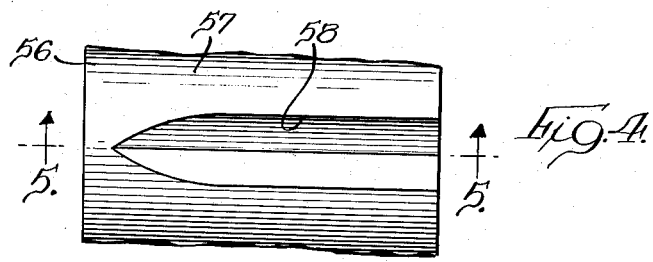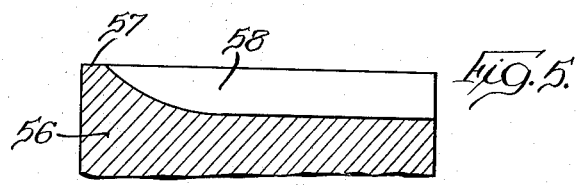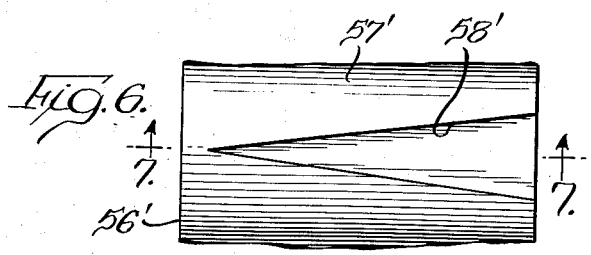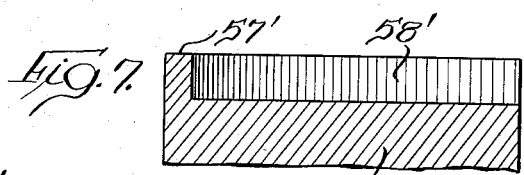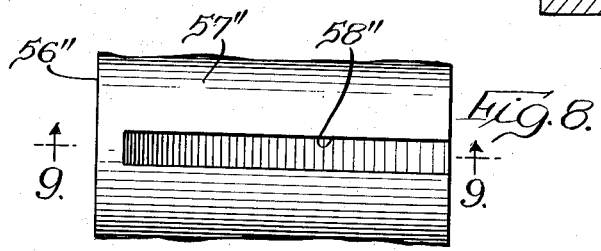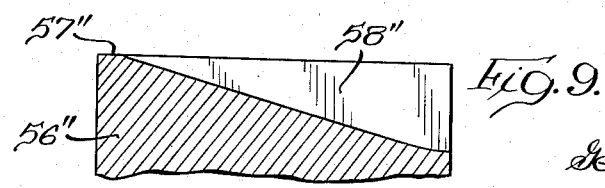

United States Patent Office 2,974,642
Patented Mar. 14, 1961

2,974,642
CONTROL VALVE

George M. Statkus, Chicago, Ill., assignor to Acme Industrial Company, Chicago, Ill., a corporation of Illinois Filed June 4, 1959, Ser. No. 818,110
11 Claims. (Cl. 121—45)

This invention relates in general to control valves and in particular to rate or feed valves usable in fluid control systems selectively to establish respectively different restrictions to the flow of fluid.

It is the general aim of the invention to provide an improved control valve of simple and economical construction and in which the restriction to fluid flow in a given direction may be readily adjusted and preselected, such restriction being independent of the restriction or resistance to the flow of fluid in the opposite direction.

Another important object of the invention is to provide a single valve structure in which the two effective restrictions or metering actions to the flow of fluid in opposite directions may be individually selected, and also individually adjusted over a relatively wide range.

A related object is to bring forth such a valve in which no springs or other yieldable parts are required, and in which the change-over from one restriction to forward flow to a different restriction to reverse flow through the valve is effected by the action of the passing fluid itself.

A further related object is to provide such a control valve which has, in operation, only two relatively movable parts, e.g., a casing and a plunger therein.

Another object of the invention is to make it possible for the sizes of both the forward and reverse flow restrictions in a single valve to be individually pre-established for each of the successive steps of a plural-step program of control.

Other objects and advantages will become apparent as the following description proceeds, taken in conjunction with the accompanying drawings in which:

Figure 1 is a diagrammatic illustration of a hydraulic control system for reciprocating the slide of a turret lathe, such system constituting an exemplary application of the feed control valves constructed according to the present invention;

Fig. 2 is an elevational view, partly in section, of a feed valve assembly embodying the features of the invention;

Fig. 3 is a cross-sectional view taken substantially along the line 3—3 in Fig. 2;

Figs. 4 and 5 are fragmentary detail views of the valve land and recess, such views being taken substantially along the lines 4—4 and 5—5 in Figs. 2 and 4, respectively;

Figs. 6 and 7, and Figs. 8 and 9, are paired views similar to Figs. 4 and 5 but illustrating two modifications in the shape of the valve land recess; and Fig. 10 is similar to Fig. 2, although illustrating a further modification.

While the invention has been shown and is described in some detail with reference to particular embodiments thereof, there is no intention that it thus be limited to such detail. On the contrary, it is intended here to cover all modifications, alternative constructions and equivalents falling within the spirit and scope of the invention as defined by the appended claims.

The hydraulic control system illustrated in Fig. 1 includes a feed or rate valve 10 which is illustrated in greater detail by Figs. 2–5 as a preferred embodiment of the present invention. Because the control system shown in Fig. 1 typifies the background or environment in which the feed valve finds advantageous use, such system will first be briefly described.

As illustrated diagrammatically, the turret slide 12 of a turret lathe (not fully shown) is adapted to be reciprocated toward and away from a workpiece 14 by a double-acting hydraulic actuator 15 made up of a cylinder 16 and piston 18, the rod of the latter being connected to the slide 12. A turret 19 is rotatably indexable about a vertical axis on the slide 12, and carries five metal working tools 20–24. As the slide 12 is advanced toward the workpiece 14, which is held in and rotated with a spindle chuck 25, the cutter or tool adjacent the workpiece 14 will engage the latter and perform some type of machining or cutting operation. The turret is then retracted away from the workpiece 14 and automatically angularly indexed, by a mechanism which is well known and thus not illustrated, to bring the next tool into the position to engage the workpiece 14 during the next cycle of movement.

To control the operation of the hydraulic actuator 15, the opposite ends of the cylinder 16 are connected through a four-way reversing valve 26 to a fluid pressure source or pump 28 and a fluid sump 29. More specifically, a conduit 30 leads from the left end of the cylinder 16 to a port 31 in the body of the reversing valve 26, while conduits 32, 32a lead from the right end of the cylinder 16 through the feed valve 10 to a port 34 in the body of the reversing valve 26. The output of the pump 28 is directed to a port 35, while spaced ports 36, 37 in the reversing valve body lead directly to the sump 29.

If a solenoid 40 is energized to shift the plunger 41 of the reversing valve 26 to the left against the bias of a spring 42, the three lands on the plunger 41 will be so disposed relative to the ports in the valve body that the output of the pump 28 will be connected through the feed valve 10 to the right end of the cylinder 16, and the left end of the cylinder 16 will be connected to the sump 29. Accordingly, fluid will flow into the right end of the cylinder 16 at a rate determined by the restriction to flow presented by the feed valve 10, assuming that the pump pressure and the resistance to movement of the piston 18 do not change appreciably.

On the other hand, if a solenoid 44 is energized to shift the valve plunger 41 to the right, against the bias of a spring 45 (as illustrated in Fig. 1), the valve lands on the plunger 41 will be so positioned as to establish communication between the output of the pump 28 and the left end of the cylinder 16, and also communication from the right end of the cylinder 16 through the feed valve 10 to the sump 29. Under these circumstances, the piston 18 will retract the turret slide 12 away from the workpiece 14, the rate of movement being determined by the restriction resistance to fluid flow presented by the feed valve 10.

In those cases where it is desired that the turret slide be moved at a very rapid or traverse rate, a normally closed by-pass valve 46 may be opened by energizing an associated solenoid 48, this valve thus by-passing the feed valve 10 and effectively removing the restriction to flow which is otherwise presented by the latter valve.

In the exemplary arrangement illustrated by Fig. 1, it is frequently desired that the turret 12 be moved rapidly toward the workpiece 14 until the adjacent one of the tools 20–24 has closely approached the workpiece. Thereafter, the turret slide 12 and the operatively-positioned tool must be moved at a slower or feed rate as the latter engages the workpiece. This forward feed rate must, in many instances, be selected according to the particular tool being used. For example, the tool 20 might be moved at a relatively high feed rate into the workpiece 14, while the tool 21 might require very slow feeding into the work.

After the cutting tool has been advanced sufficiently into the workpiece 14, the turret slide 12 is retracted by deenergizing the solenoid 40 and energizing the solenoid 44. In some cases, the by-pass valve 46 may be opened as soon as reversing occurs, so that the turret slide moves rearwardly at a rapid traverse rate. In other instances, however, it is desired that the cutter be "backfed" or returned slowly from its point of furthest advancement into the workpiece 14. Moreover, the optimum rate of backfeeding may be different for each cutter. It is desirable, therefore, not only to provide for backfeeding, but to make the particular value of such backfeeding individually selectable as the turret indexes successively to its five angular positions.

It is the function of the feed valve 10 to provide a restriction between the conduits 32, 32a so as to determine the rate of feeding of the piston 18 and turret 12 when the latter are moving in a forward direction, and also to determine the rate of backfeeding, i.e., the velocity of the piston 18 and turret 12 when the latter are being fed in a reverse direction. Of course, at times when rapid traverse motion, rather than feeding is desired, the valve 46 may be opened to by-pass the feed valve 10.

In accordance with a preferred embodiment of the invention, the feed valve 10 comprises a casing 50 (Fig. 2) having first and second chambers 51 and 52 defined therein and connected by a passageway 54. Slidably disposed in the casing 50 is a plunger 55 having land portion 56 with its surface 57 slidably and matingly disposed in the passageway 54. The land 56 is formed with a recess 58 in the surface thereof, such recess tapering in cross section in a direction toward the second chamber 52. Finally, stop means engageable by the plunger 55 are provided to limit the movement of the land 56 toward the second chamber 52. Such stop means are here exemplified by an adjustable stop screw 59 positioned to be engaged by the end of a stem 60 forming an integral part of the plunger 55 and projecting through the casing 50.

When fluid is being returned through the conduits 32 and 32a to the sump 29 (Fig. 1), it passes from the conduit 32 to the chamber 51 (Fig. 2), thence through the depression or recess 58, then through a small opening 61 formed between the wall of the passageway 54 and the left end of the recess 58, to the chamber 52. From the chamber 52, fluid may pass to the conduit 32a and thence to the sump 29 of Fig. 1.

It will be seen that the size of the opening 61, and the restriction or resistance to fluid flow which it presents, is determined by the axial position of the plunger 55. Because the pressure of the fluid flowing from chamber 51 to chamber 52 urges the plunger 55 to the left, the axial position of the plunger depends upon the setting of the stop screw 59. Thus, the resistance to fluid flow in a first direction, i.e., from conduit 32 to conduit 32a, is determined by the plunger 55, recess 58 and the stop screw 59 which together establish the size of the restriction or opening 61. Viewed in another sense, the recess 58 forms a channel between the chambers 51 and 52, the minimum cross-sectional area (at 61) of such channel increasing in size as the land 56 is moved toward the chamber 52. It will be noted that it is the pressure of the fluid itself in attempting to flow from conduit 32 to conduit 32a which forces or urges the plunger 55 to move toward the left until it is in engagement with the stop screw 59.

Referring to Figs. 4 and 5, the shape of the depression or recess 58 formed in the land surface 57 of the land 56 is there more clearly illustrated. It will be seen from Fig. 4 that the recess 58 tapers in width in a direction toward the left end of the land 56, that is, the recess becomes progressively narrower toward its left end. Also, the recess 58 tapers in depth, i.e., becomes progressively shallower towards its left end (Fig. 5).

Thus, it will be apparent that as the left extremity of the recess 58 is shifted further and further from beneath the left end of the passageway 54 (Fig. 2), the metering orifice or restriction 61 becomes progressively larger. By adjustment of the stop screw 59 the size of this metering orifice and the rate at which the piston 18 (Fig. 1) is fed may be pre-established. Whenever the stop 59 is opposite the plunger 55, this same rate will always be established, assuming that the stop screw 59 has not been reset.

The foregoing discussion has been concerned with the construction and operation of the feed valve 10 in producing a restriction or metering action to fluid flow in a first direction, i.e., from the conduit 32 to the conduit 32a. In order to create a preselectable and adjustable restriction to fluid flow in the opposite direction, i.e., from the conduit 32a to the conduit 32, a second recess 65 is formed in the surface 57 of the land 56. The recess 65 is similar in size and shape to the recess 58 but tapers in the opposite direction. That is, the recess 65 opens fully at the left end of the land 56, and tapers in cross-sectional area toward the right end of the land, i.e., toward the first chamber 51. A second stop in the form of an adjustable screw 66 is disposed opposite a stem 68 integral with the plunger 55. This stop determines the limit position to which the plunger 55 may shift to the right.

Thus, it will be apparent that when fluid flows from the conduit 32a to the conduit 32, the pressure of that fluid will urge the plunger 55 to the right (Fig. 2) until the stem 68 engages the stop 66. This will determine the extent to which the right end of the tapered recess 65 projects from the passageway 54, and thus the size of a metering orifice or restriction in the fluid flow path.

It will be seen from Fig. 2 that the casing 50 for the valve 10 is relatively simple in construction, employing simply a sleeve 50a machined to define the central passageway 54 therein, such sleeve being closed at its opposite ends by threaded plugs 50b and 50c bored to slidably receive the stems 60 and 68. The sleeve 50a may be disposed within a main body 50d forming a part of the entire assembly. Appropriate resilient sealing members are provided, as shown, to prevent leakage of fluid between the adjacent parts of the valve.

In order to make it possible to pre-establish both the forward feed rate and the back feed rate for each of several cycles of operation, that is for each of the tools 20–24 in Fig. 1, provision is made to establish different right and left limit positions of the valve plunger 55 for successive cycles of turret motion. As here illustrated in Figs. 1 and 2, a plurality of forward stops are associated with the stop 59. There are five such stops including stops 59a and 59b, only three being visible in Fig. 2. These stops 59, 59a and 59b are all adjustable in that they are formed as adjustable stop screws; and all are carried by a disk 70 fixed to a collar 71 which is angularly indexable to bring any one of the stops opposite the plunger stem 60.

In like manner, a plurality of stops are associated with the stop 66. There are five such stops at the right end of the valve 10, only three of these stops 66, 66a and 66b being visible in Fig. 2. Again, such stops 66, 66a, 66b take the form of adjustable stop screws carried by a disk 72 connected with an angularly indexable collar 73, rigid with the collar 71.

As illustrated by the schematic connecting line 74 in Fig. 1, the turret 12 is connected with the collars 71, 73 and the disks 70, 72 so that as the turret 12 indexes to successive ones of its five angular positions, successive ones of the right and left stops are brought opposite the valve plunger stems 68 and 60. Since each of these stops may be preset in an axial direction, it is possible to pre-establish individually both the forward rate of feed and the back rate of feed which will be imparted to the piston 18 and the turret 12 whenever the latter is in each one of its successive angular positions. Thus, the forward feed rate and the back feed rate appropriate for each of the tools 20-24 may be preselected by setting the stop screws shown in Fig. 2, and will be automatically produced during successive programs of operation as a plurality of workpieces 14 are successively machined.

As noted above in connection with Figs. 4 and 5, the depressions or recesses 58 and 65 (Fig. 2) are tapered both in width and in depth in order to produce adjustable orifices or restrictions to the flow of fluid as the plunger 55 is given different axial positions. However, substantially the same advantages may be obtained by forming the recesses in the land surface 57 so that they taper either in width alone or in depth alone. Figs. 6 and 7 illustrate a land 56' having a land surface 57' with a recess 58' defined therein. It will be apparent that the recess 58' tapers in width only toward the left end of the land 56', and is of uniform depth (Fig. 7). This configuration for the recess 58' would, nevertheless, operate in substantially the same way as previously described in connection with the recess 58.

Figs. 8 and 9 illustrate a further modification in the configuration or shape of the recess or recesses formed in the valve land. As there shown, a land 56" having a land surface 57" is formed with a depression or recess 58" therein, such recess being of uniform width (Fig. 8) but of tapered depth (Fig. 9). As the shallower, left end of this recess 58" is moved progressively out of a passageway, such as that shown at 54 in Fig. 2, however, a restriction or orifice of progressively larger cross-sectional area will be created. The recess configuration illustrated in Figs. 8 and 9 may be used in lieu of that illustrated in Figs. 4 and 5. A variety of other specific recess configurations may be employed to achieve the operational results noted above.

Referring now to Fig. 10, a further modification of the feed valve shown in Figs. 2-5 is there illustrated. In lieu of providing a plurality of stops to individually determine the limit positions at which the plunger 55 shifts to the right, a single adjustable stop may be employed. The disk 72 and the stops 66, 66a, 66b of Fig. 1 are all omitted from the embodiment of Fig. 10. Instead, a single stop in the form of a cap 80 is cooperatively disposed opposite the stem 68 of the plunger 55. For purposes of adjustment, the cap 80 is threaded as at 81 on the sleeve 50a, so that the axial position of the cap may be adjusted. Thus, as the disk 70 is angularly indexed to bring successive ones of the stops 59, 59a and 59b into cooperative position opposite the plunger stem 60, thereby to determine the restriction or rate of fluid flow from the conduit 32 to the conduit 32a, the restriction to flow of fluid in the opposite direction remains fixed, i.e., remains the same, as established by the adjustment of the cap 80. This arrangement may be employed in hydraulic control systems where it is desired that the forward feed rate change for successive steps within an over-all program, while the backfeed rate remains the same for all such steps. Except for the differences noted above, the construction illustrated in Fig. 10 is substantially identical to that illustrated in Fig. 2.

I claim as my invention:

1. A rate control valve comprising, in combination, a casing having first and second chambers defined therein and connected by a passageway, a plunger having a land surface mating with and slidable in said passageway, first and second depressions formed in the surface of said land and being of graduated configuration in respectively opposite directions, first and second stop means for limiting the movement of said plunger in opposite directions, whereby the restrictions to flow of fluid in opposite directions between said chambers are determined respectively by said first and second stop means.

2. A rate control valve comprising, in combination, a casing having two chambers defined therein and connected by a passageway, a plunger in said casing and having a land mating with and slidable in and slightly longer than said passageway, said land having two lengthwise grooves cut in its surface each starting with full depth at opposite ends of said land and tapered in depth toward the other ends of said land, and means for limiting the movement of said plunger in opposite directions thereby respectively to determine the restrictions presented to fluid flow in opposite directions between said chambers.

3. A rate control valve comprising, in combination, a casing having two chambers defined therein and adapted for connection to fluid conduits, a passageway defined in said casing and extending between said chambers, a plunger having a land surface mating with and slidable back and forth in said passageway, said land surface having first and second recesses formed therein and extending in the direction of plunger movement, said first recess being open to said first chamber in all positions of said plunger and being progresisvely smaller in transverse cross section toward that end of said land surface which is adjacent said second chamber, said second recess being open to said second chamber in all positions of said plunger and being progressively smaller in transverse cross section toward that end of said land surface which is adjacent said first chamber, the smaller ends of said recesses being spaced apart less than the length of said passageway so that communication is established between said chambers by only one of said recesses at a time, and first and second adjustable means for limiting the movement of said plunger in opposite directions to respectively determine the size of restrictions to fluid flow in opposite directions between said chambers.

4. The combination set forth in claim 3 further characterized in that said recesses are progressively shallower in depth below the land surface toward respectively opposite ends of said land surface.

5. The combination set forth in claim 3 further characterized in that said recesses are progressively narrower in width toward respectively opposite ends of said land surface.

6. The combination set forth in claim 3 further characterized in that said recesses are progresively shallower in depth and narrower in width toward respectively opposite ends of said land surface.

7. In a rate control valve, the combination comprising a casing having two chambers defined therein and adapted for respective connection to fluid conduits, a passageway defined in said casing and extending between said chambers, a plunger having a land surface mating with and slidable back and forth in said passageway, a recess defined in said land surface and extending in a direction substantially paralleling the direction in which said plunger is slidable, said recess tapering in cross-sectional area toward that end of the land surface which is closest to one of said chambers, a plurality of stop members, and means movably mounting said stop members to selectively bring them into cooperative relationship with said plunger to limit the movement of the land surface toward said one chamber.

8. In a rate control valve, the combination comprising a casing having first and second chambers defined therein and adapted for connection to fluid conduits, a passageway defined in said casing and extending between said chambers, a plunger having a land surface mating with and slidable back and forth in said passageway, a pair of recesses defined in said land surface, said recesses both extending in a direction substantially paralleling the direction in which said plunger is slidable and respectively tapering in cross-sectional area toward opposite ends of said land surface, a first plurality of stops for limiting sliding of said plunger in one direction, a second plurality of stopsfor limiting sliding of said plunger in the other direction, and means for indexing selected ones of each plurality of stops into an operative position with respect to said plunger.

9. In a control system having a reversible hydraulic actuator for shifting a controlled member back and forth, and including two fluid conduits leading to the actuator and alternately and complementally vented and connected to a fluid pressure source, the combination comprising a rate control valve interposed in one of said conduits, said valve including a casing having two chambers defined therein and a passageway extending between said chambers, a plunger having a land surface mating with and slidable back and forth in said passageway in response to pressure differentials of opposite senses between said chambers, a pair of recesses defined in said land surface and extending substantially parallel to the direction in which said plunger is slidable, said recesses tapering in cross-sectional area toward respectively opposite ends of said land surface, an indexable member, a plurality of adjustable stops carried on said member to be brought successively into positions to limit the movement of said plunger toward said second chamber, and means for indexing said member to bring said stops successively into limiting positions in response to said controlled member executing each cycle of motion.

10. A rate control valve comprising, in combination, a casing having first and second chambers defined therein and connected by a passageway, a plunger having a land surface mating with and slidable in said passageway in response to difference of pressure in said chambers, said land surface having first and second depressions formed therein and extending in the direction of plunger movement, said first and second depressions being respectively tapered in cross-sectional area toward said first and second chambers, the ends of said depressions which are of the smallest cross-sectional area being spaced apart in the direction of plunger movement less than the length of said passageway, and means for limiting the extent of movement of said plunger in opposite directions.

11. A rate control valve comprising, in combination, a casing having first and second chambers defined therein and connected by a passageway defined by a surface, a plunger having land surface mating with said passageway surface and slidable relative thereto in response to difference of pressure in said chambers, first and second depressions formed in one of said surfaces and being graduated in cross-sectional configuration in respectively opposite directions, and first and second stop means for limiting the movement of said plunger in opposite directions, whereby the flow of fluid in opposite directions between said chambers shifts said plunger to one of the other of two limit positions determined respectively by said first and second stop means to create first and second restrictions to such flow.

References Cited in the file of this patent

UNITED STATES PATENTS

| | | |
|---|---|---|
| 2,480,403 | Ferris | Aug. 30, 1949 |
| 2,929,393 | Wallace et al. | Mar. 22, 1960 |